June 3, 1969   J. M. SELIGER   3,447,396
DIFFERENTIAL MECHANISM
Filed June 9, 1967   Sheet 1 of 2
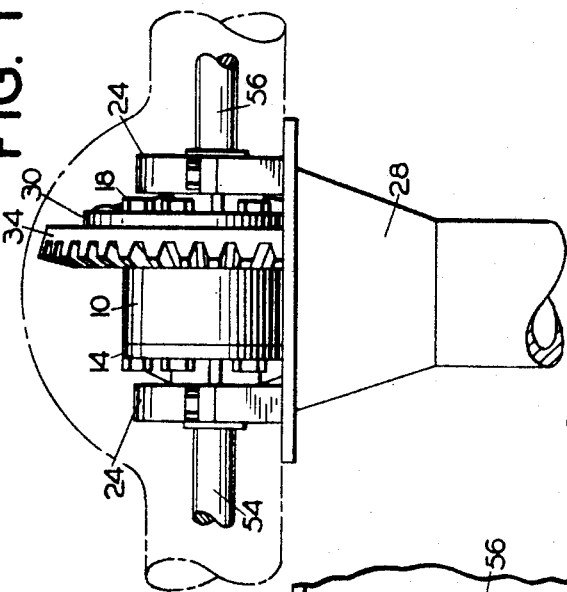
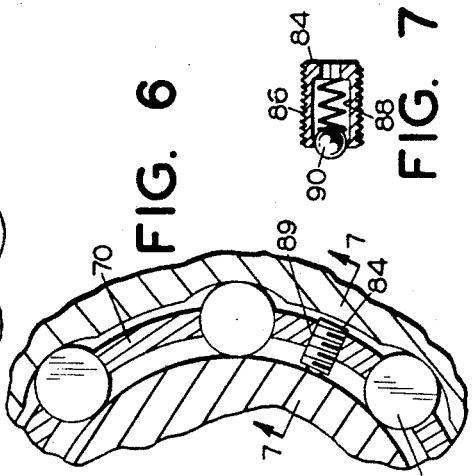
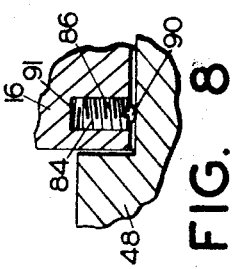
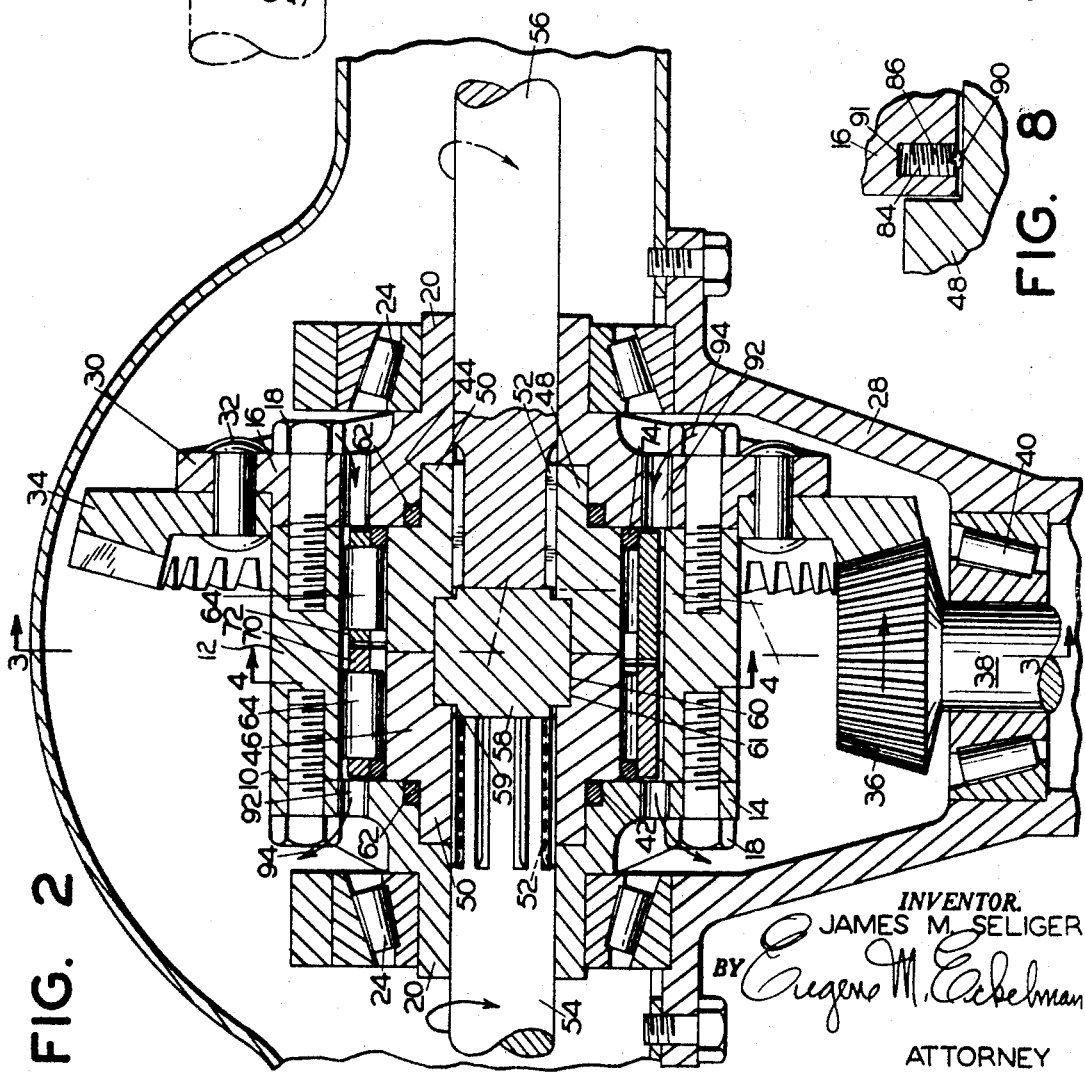
INVENTOR.
JAMES M. SELIGER
BY Eugene M. Eckelman
ATTORNEY June 3, 1969  J. M. SELIGER  3,447,396
DIFFERENTIAL MECHANISM
Filed June 9, 1967

INVENTOR.
JAMES M. SELIGER
BY Eugene M. Eckelman
ATTORNEY

United States Patent Office 3,447,396
Patented June 3, 1969

3,447,396
DIFFERENTIAL MECHANISM
James M. Seliger, 303 SE. 172nd Ave.,
Portland, Oreg. 97233
Filed June 9, 1967, Ser. No. 644,929
Int. Cl. F16h 35/04
U.S. Cl. 74—650             4 Claims

ABSTRACT OF THE DISCLOSURE

The invention includes a differential mechanism of the type using a roller connection between a drive member and driven means. The rollers are confined in cages, and included in the mechanism are two sets of friction devices one of which provides for a positive operating control of the roller-containing cages and the other of which eliminates shock and other reactions which otherwise may be caused by loose fitting parts.

---

This invention relates to new and useful improvements in differential mechanisms and more particularly to improvements in that type of differential mechanism which employs rollers as the connection between driving and driven members.

Prior differential mechanisms which utilize rollers as the connecting means between driving and driven members have been extremely complex and furthermore have not performed satisfactorily because it has not been possible to produce a mechanism having a smooth drive connection through the rollers and through other structure. Furthermore, as soon as wear occurs between portions of the driving and driven members in the prior devices, driving connections of the roller locking type differential may become damaged by shock.

According to the present invention, a differential mechanism has been conceived of the positive contact roller type which has as its primary objective to include friction means providing first for positive control of roller control cages and second for the take up of slack between driving and driven members. The combination of the two friction devices provides a structure which has a more positive drive and which operates smoothly and quietly. The invention will be better understood and additional objects and advantages will become apparent from the following description taken in connection with the accompanying drawings which illustrate preferred forms of the device.

FIGURE 1 is a plan view of the present differential mechanism, a portion of the housing for such mechanism being shown in phantom lines;

FIGURE 2 is a sectional view of the present invention, taken on the line 2—2 of FIGURE 3;

FIGURE 6 is a fragmentary sectional view taken on a line similar to FIGURE 4 but showing a second embodiment of the friction means between the roller control cages and driven members;

FIGURE 7 is a detailed sectional view of a friction device employed in the FIGURE 6 embodiment, taken on the line 7—7 of FIGURE 6; and FIGURE 8 is a fragmentary sectional view taken on a line similar to FIGURE 2 but showing a second embodiment of friction means between the drive and driven members.

Figure 5:
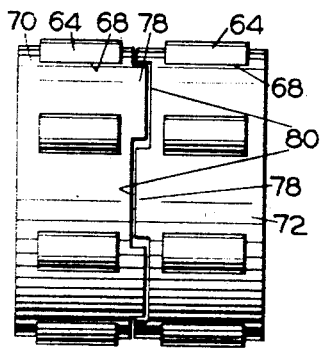
FIGURE 5 is an elevational view of cage means employed for controlling the operation of rollers in the present differential, such cage means being shown apart from the other mechanism.

With particular reference to the drawings and first to FIGURES 1 through 5, the invention comprises a casing 10 composed of a rotatable, tubular body section 12 and end plates 14 and 16 secured to the body section by stud screws 18. Each of the end plates 14 and 16 has an outwardly directed, tubular extension 20 having an outer surface portion on which is mounted anti-friction roller-type bearings 24 having a supporting engagement in a differential housing 28. For the present purpose, housing 28 may be disposed at the rear and/or the front of a vehicle whichever the case may be, and as apparent, rotatably supports the casing 10 therein. End plate 16 has a radial flange 30 to which is securely fixed, as by rivets 32, a ring gear 34. Gear 34 meshes with and is driven by a pinion gear 36 secured on the usual drive shaft 38. Shaft 38 has journaled support in a forward portion of the housing 28 by means of a bearing 40.

Each of the inner faces of the end plates 14 and 16 has a bore or recess 42 and a counterbore or recess 44. Driven members 46 and 48, in the form of cylindrical tubular bodies, are arranged in co-axial relation within the body section 12, and each of these driven members has a reduced tubular extension 50 extending into and having a rotatable fit in the counterbore 44 of respective end plates 14 and 16. The driven members 46 and 48 have splined connections 52 with the inner ends of independently rotatable shafts 54 and 56, respectively. Shafts 54 and 56 comprise the right and left axles, respectively, of a divided wheel axle. These axles have a rotatable fit within the tubular extensions 20.

The inner ends of the axles 54 and 56 are spaced apart, and contained in this area is a circular spacer block 58. Block 58 has outer edge grooves 59 and the reduced portion 60 formed by said grooves is rotatably fitted in grooves 61 of the driven members. The block 58 maintains the axles in spaced position and also provides good internal support for the driven members 46 and 48.

Mounted on the tubular extensions 50 of the driven members 46 and 48 and contained in the recesses 42 are friction devices such as O-rings 62 which as will be seen in greater detail hereinafter eliminate shock which may occur between drive shaft 38 and the driven shafts or axles 54 and 56.

Figure 4:
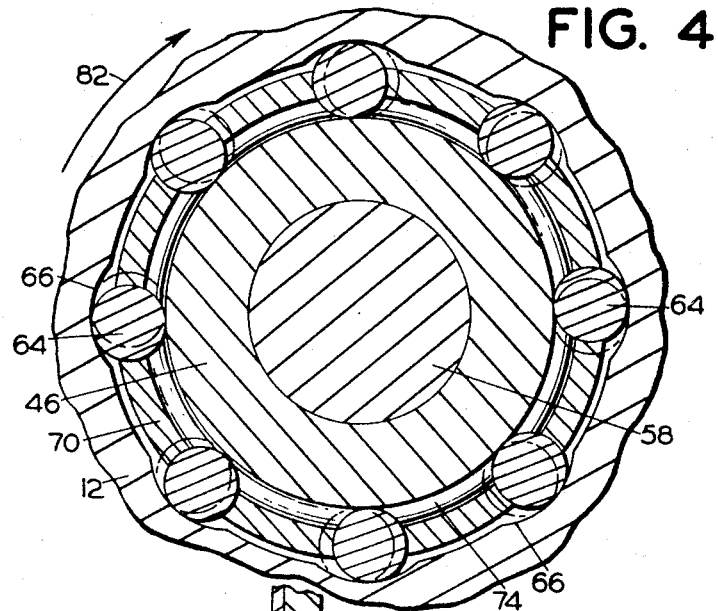
FIGURE 4 is a fragmentary sectional view taken on the line 4—4 of FIGURE 2.
Figure 3:
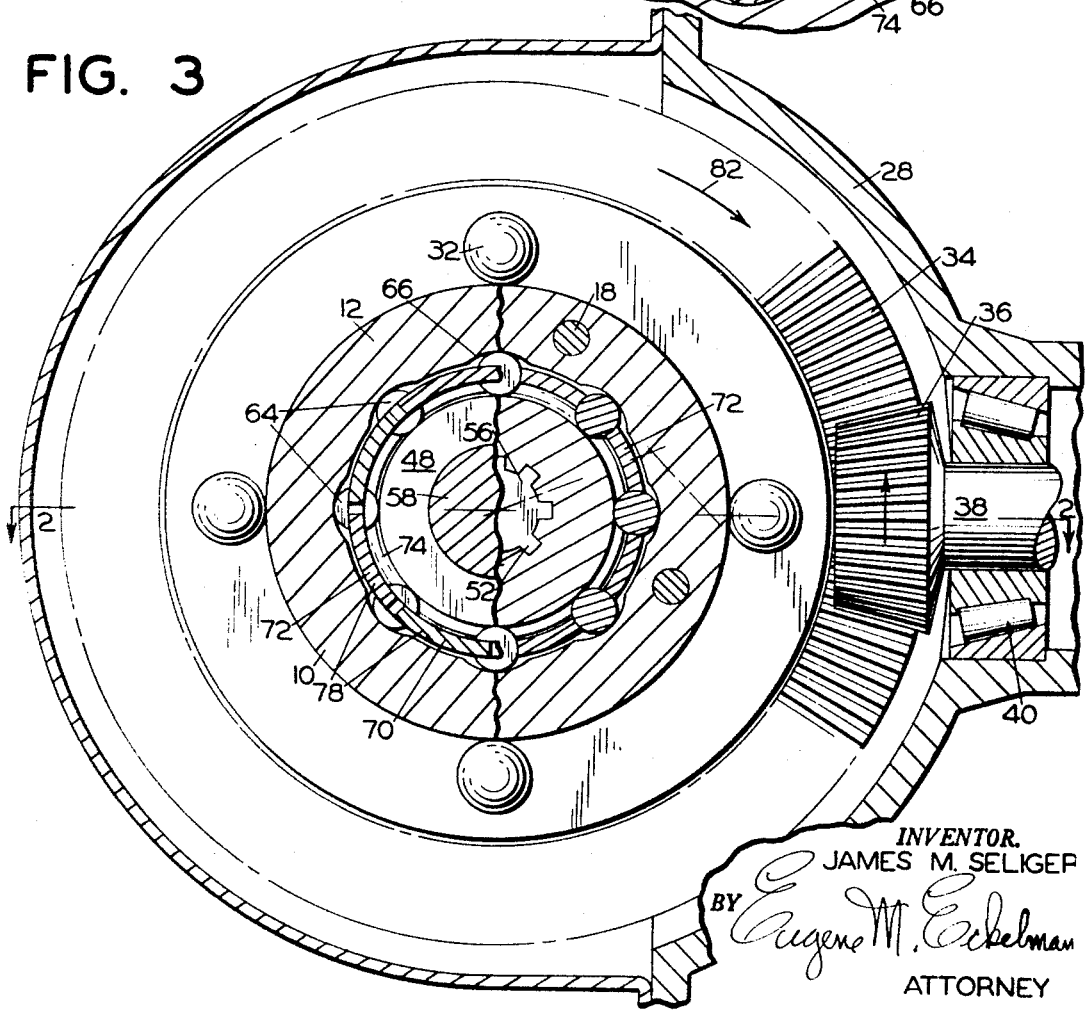
FIGURE 3 is a sectional view taken on the line 3—3 of FIGURE 2.

The driving connection between the tubular body section 12, which comprises the driving member, and the driven members 46 and 48 comprise caged rollers 64 acting between the outer periphery of driven members 46 and 48 and the inner periphery of driving member 12. With reference to FIGURES 3 and 4, each of the rollers is engageable with and confined in a curved area 66, and these curved areas are disposed at uniformly spaced intervals on the internal periphery of the annular driving member 12. The number of driving rollers 64 corresponds to the number of curved areas 66 and such rollers are in the form of hardened round metal bars having their axes parallel to the axis of the driving member 12. These rollers are adapted to wedgingly engage between said driving member and the driven members 46 and 48 to drive the respective axle sections or free the same for differential movements.

The rollers 64 for the driven members 46 are confined in radial slots 68 in a cage 70 of tubular construction, FIGURES 2, 4 and 5, and the rollers 64 for driving the driven member 48 are confined in radial slots 68 in a cage 72, FIGURES 2, 3 and 5. The cages are freely confined between the driving member 12 and the driven members 46 and 48 and permit or assist in the automatic shifting of the rollers 64 between positions of contact or drive connection, to be described.

A friction device 74, FIGURES 2 and 3, such as an O-ring, is disposed between each of the cages 70 and 72 and their respective driven members 46 and 48. The cages comprise annular rings and the friction devices 74 bear frictionally between said cages and the driven members so that, as will be seen in greater detail hereinafter, when one of the driven members is operative in a differential movement the cage associated therewith is immediately responsive to such movement. It has been found that neoprene O-rings provide an effective and efficient friction connection to facilitate the necessary operation of the cages.

As best seen in FIGURE 5, each of the cages 70 and 72 has keys or projections 78 on the interfacing edges thereof. These keys extend into limit slots or keyways 80 in the other cage, and in a preferred arrangement the keys and slots alternate in the two cages. That is, in progressing around the edge of the cages one key is on the cage 70 and the next key is on the cage 72. The cage portion opposite from the keys is provided with the appropriate slot 80. In a preferred arrangement there are four or more sets of keys and slots, with two or more of such keys and slots being provided on each cage. The use of two pairs or more of slots and corresponding keys provides a balanced and smooth operating movement of the two cages. In a preferred construction, the keys 78 are of substantial circumferential length, namely, they extend approximately 90 degrees through the circumference of the cages. Such provides a strong connection between the two cages.

The slots 80 have a width greater than the width of the keys 78, and for the present purpose and referring either to FIGURE 3 or FIGURE 4 the relative movement of the cages which is permitted by the keys and slots comprises approximately one-half the distance of total travel allowed for the rollers 64 from one side of the curved segment 66 to the other side. That is, when the rollers of one cage are in drive engagement at one end of the curved areas 66, the other rollers can move with their cage to a position substantially centered in the areas 66. This centered position comprises a neutral position of the rollers, such a position being shown in FIGURE 3.

With regard to the operation of the present mechanism, it is to be assumed that power is being applied to the drive shaft 38 to drive the ring gear 34 and hence the body section 12 in a direction indicated by the arrows 82 in FIGURES 3 and 4, such direction comprising a forward drive direction of the vehicle. With the vehicle traveling straight ahead and with the right and left wheels having equal traction on the road, the rollers 64 occupy a trailing position in the curved areas 66 to engage a rearward portion of such curved areas for the necessary wedging action to establish a driving connection between the driven members 46 and 48 and the driving member 12. The axles of the vehicle thus operate at one and the same speed. The position of the cages and rollers in the drive position above mentioned is shown in the full line position in FIGURE 4.

Upon executing a turn under power the overriding outboard wheel is disengaged and running free in the first part of a turn. As the vehicle proceeds into the turn, the inside wheel takes a slower speed than the outboard wheel, thus causing the rollers to disengage or back up from the locked position. The driving force is thrown to the outside wheel which then picks up the load and continues to power the vehicle through and out of the turn. Then, in straight-ahead driving, the unit locks up and both wheels drive. The positioning of the cage 70 to a neutral condition of the rollers 64 is controlled by the selected dimension of keys 78 and slots 80 wherein the slots are enlarged with relation to the keys to stop one cage in a neutral position when the other cage is in a drive position.

Should the power be removed from the drive shaft 38 during straight ahead travel of the vehicle the cages 70 and 72 will be dragged by the friction means 74 to a position to cause the rollers 64 to shift to the other extreme position and then make a positive wedging contact against the opposite working portion of the curved surfaces 66 so as to maintain the positive driving connection to the drive shaft 38. This position of the rollers is shown in phantom lines in FIGURE 4.

A differential action will be obtained when backing the vehicle with or without power, either in a straight course or when executing turns. Should either wheel be stuck in a rut, or be under any road condition in which one wheel has greater traction than the other, the driving member 12 and one or the other of the sets of rollers 64 as the case may be will co-act with the respective driven member 46 or 48 to automatically lock the driven member into a driving position to activate the wheel having the greater traction. Such driven member will be locked to the propeller shaft when being driven until such time that the traction of both wheels is equalized. This arrangement thus prevents the waste of power on the wheel having lost traction as is the function of conventional differential mechanisms now in use. The friction devices 62 which exist between the driven members 46 and 48 and the driving member 12 serve to eliminate the slapping between the axle splines or between other connections of the drive and driven members. More particularly, the friction connection caused by the O-rings 62 restrains somewhat the relative rotation between the parts and serves to prevent shock which otherwise would arise from a wear of the parts.

The present invention thus far described demonstrates the use of O-rings 62 and 74 as the friction devices for the stated purpose. However, with reference to FIGURES 6, 7 and 8, other types of friction means may be employed. For example, as seen in FIGURES 6 and 7, a friction device 84 in the form of an insert with exterior threads 86 is adapted for threaded mounting in the cages 70 and 72 to serve the same function as the O-rings in FIGURE 1. The devices 84 have internal bores 88 for receiving a spring pressed ball 90 adapted to bear frictionally against the outer periphery of the driven members 46 and 48. These friction devices cause a connection between the cages and their respective driven members similar to the O-rings. That is, the friction means are in constant engagement with the driven members and when one of the driven members is operative in a differential movement the cage associated therewith is immediately released. The friction devices 84 are suitably mounted in threaded bores 89 in the cage, and the extent of frictional engagement of the balls 37, and therefore the responsive effect of the cage with the driven members, is determined by the amount of threaded penetration of the devices 84 in the cages.

With reference to FIGURE 8, the spring-pressed ball friction devices 84 may also be utilized in lieu of the O-rings 62 and for this purpose, such inserts are mounted in the end plates 14 and 16 and caused to bear against the periphery of driven member 46 and 48 respectively. To mount the friction devices on the end plates 14 and 16, suitable tapped bores 91 are provided in a surface of the end plates which rotatably bears on the driven members and the ball 90 engages the latter members.

The friction devices may still take other forms than those shown. It is the chief purpose of the present invention to provide an arrangement of friction devices which first accomplishes a positive and efficient action of the cages to control the operation of the rollers 64 and second to eliminate substantially any shock which may exist between the driving member and the driven members as a result of wear anywhere in the assembly.

End plates 14 and 16 are provided with at least two apertures 92 which permit circulation of oil through the cages and other parts of the differential. The circulation of the oil is designated by the arrows 94, and serves to keep the parts well lubricated for efficient operation.

It is to be understood that the forms of the invention herein shown and described are to be taken as preferred examples of the same and that various changes in the shape, size, and arrangement of parts may be resorted to without departing from the spirit of the invention or the scope of the subjoined claims.

I claim:
1. A differential driving mechanism comprising:
   (a) a rotatable drive casing,
   (b) a pair of driven members coaxially mounted in end to end relation in said casing for independent rotation,
   (c) means defining recesses on the periphery of one of said drive casing and driven members,
   (d) rollers freely mounted between said drive casing and each of said driven members in said recesses for circumferential movement between a released position and a drive connection between said casing and said driven members in either direction by a wedging action of the rollers therebetween,
   (e) a pair of annular cages for the rollers freely mounted concentrically in opposed relation on said driven members for adjustatable rotation relative thereto,
   (f) means engageable between said cages permitting selective relative rotation of said cages to position said rollers between their released position and driving connection position in said recesses to disengage the rollers in one cage from one of said driven members and hold them in an intermediate disengaged position in the recesses upon a differential requirement of said mechanism,
   (g) first friction means interengaged between said cages and said driven members to provide increased response of the cages to a differential requirement,
   (h) and second friction means interengaged between said drive casing and said driven members to cushion slack in the mechanism.

2. The differential driving mechanism of claim 1 wherein said first and second friction means comprise O-rings.

3. The differential driving mechanism of claim 1 wherein one of said first and second friction means comprises an O-ring and the other of said first and second friction means comprises spring pressed ball members.

4. The differential driving mechanism of claim 1 wherein the first and second friction means comprises spring pressed ball members.

References Cited

UNITED STATES PATENTS

| 2,966,075 | 12/1960 | Howick | 74—650 |
| 3,066,551 | 12/1962 | Burnham | 74—650 |
| 3,124,972 | 3/1964 | Seliger et al. | 74—650 |
| 3,173,309 | 3/1965 | Seliger | 74—650 |
| 3,283,611 | 11/1966 | Weismann et al. | 74—650 |

ARTHUR T. McKEON, *Primary Examiner.*

U.S. Cl. X.R.

192—45, 50